United States Patent Office 3,752,840
Patented Aug. 14, 1973

3,752,840
PROCESS FOR PREPARING FLUOROPERHALO-
ALKYL NITRILES
Bryce C. Oxenrider, Florham Park, and Cyril Woolf and
Robert A. Dear, Morristown, N.J., and Wilhelmus M.
Beyleveld, Deventer, Netherlands, assignors to Allied
Chemical Corporation, New York, N.Y.
No Drawing. Filed July 9, 1971, Ser. No. 161,335
Int. Cl. C07c 121/02
U.S. Cl. 260—465.7                                4 Claims

ABSTRACT OF THE DISCLOSURE

Fluoroperhaloalkyl nitriles are prepared by reacting a fluoroperhalo-1-olefin with cyanogen and an ionizable fluoride salt.

---

This invention provides an improved process for preparing fluoroperhaloalkyl nitriles.

In accordance with this invention, fluoroperhaloalkyl nitriles having the formula $R_fCF(CN)CF_3$ are prepared by reacting a fluoroperhaloolefin having the formula $R_fCF=CF_2$ with cyanogen and an ionizable fluoride salt, as represented by the following equation:

$$R_fCF=CF_2 + (CN)_2 + MF \rightarrow R_fCF(CN)CF_3 + MCN$$

In the above formulas, M represents the cation portion of the ionizable fluoride salt and $R_f$ is fluorine, chlorine, or a fluoroperhaloalkyl radical having the formula $CF_2X(CFX)_n{}^-$ wherein X is fluorine or chlorine and $n$ is 0 to 5. The reaction is carried out under substantially anhydrous conditions in an aprotic, polar, liquid reaction medium.

The fluoroperhaloalkyl nitrile product is recovered from the reaction mixture in accordance with conventional methods, such as fractional distillation.

Suitable ionizable fluoride salts include potassium fluoride, rubidium fluoride, cesium fluoride, silver fluoride and tetra(lower alkyl) ammonium fluoride. Potassium fluoride is preferred. If desired, the fluoride salt may be present as an adduct with an organic compound, such as hexafluoroacetone or chloropentafluoroacetone.

Suitable aprotic, polar, liquid reaction media include acetonitrile, dimethylformamide, dimethylsulfoxide, dimethylacetamide, glycol ethers, cyclic polymethylene sulfones, and the like. Acetonitrile is preferred.

The reaction is conveniently carried out at room temperature, but temperatures above or below room temperature, e.g. about −40° C. to about 200° C., can be employed if desired. Similarly, the pressure employed is not critical and can be above or below atmospheric pressure as desired. The reaction is conveniently carried out at pressures autogenously developed at the reaction temperatures employed.

In the preferred embodiments of this invention, $R_f$ is fluoirne or a perfluoroalkyl radical having the formula $CF_3(CF_2)_m{}^-$ wherein $m$ is 0 to 3. In especially preferred embodiments, $R_f$ is fluorine or trifluoromethyl.

The fluoroperhaloalkyl nitrile products represent a known class of useful compounds, as described, for example, in U.S. Pat. 3,234,267.

The following examples further illustrate the invention. In each example, the reaction was carried out under substantially anhydrous conditions and the perfluoroisobutyronirtile product was identified by modern analytical techniques.

EXAMPLE 1

A sealed reaction mixture containing 12 grams of potassium fluoride
16 grams of cyanogen
28 grams of perfluoropropylene
60 ml. of acetonitrile was maintained at about 100° C. for about 3 hours. After the reaction mixture had cooled to room temperature, the volatile components were removed and condensed in a cold trap. The condensate, which consisted essentially of perfluoroisobutyronitrile and unreacted perfluoropropylene, was maintained at −12° C. for about two hours to remove the perfluoropropylene. The residue, which was predominantly perfluoroisobutyronitrile, weighed 18 grams.

EXAMPLE 2

Twenty-two grams of cyanogen and 63 grams of perfluoropropylene were added to 23 grams of potassium fluoride in 150 ml. of acetonitrile at −78° C. After being sealed, the reaction mixture was allowed to warm to room temperature and remained at room temperature, with stirring, for about 4 days. The volatile components of the reaction mixture were then removed and condensed in a cold trap. Fifteen grams of crude perfluoroisobutyronitrile were obtained as product after the more volatile components of the condensate had been removed.

We claim:

1. A process for preparing a fluoroperhaloalkyl nitrile having the formula $R_fCF(CN)CF_3$ wherein $R_f$ is fluorine, chlorine, or a fluoroperhaloalkyl radical having the formula $CF_2X(CFX)_n{}^-$ wherein $x$ is fluorine or chlorine and $n$ is 0 to 5, which process comprises reacting a fluoroperhaloolefin having the formula $R_fCF=CF_2$, wherein $R_f$ is as defined above, with cyanogen and an ionizable fluoride salt, selected from the group consisting of potassium fluoride, rubidium fluoride, cesium fluoride, silver fluoride and tetra (lower alkyl) ammonium fluoride, the reaction being carried out at a temperature of from about −40° C. to about 200° C. under substantially anhydrous conditions in an aprotic, polar, liquid reaction medium.

2. The process of claim 1 wherein $R_f$ is fluorine or a perfluoroalkyl radical having the formula $CF_3(CF_2)_n{}^-$ wherein $n$ is 0 to 3.

3. The process of claim 1 wherein $R_f$ is fluorine or trifluoromethyl.

4. The process of claim 3 wherein the ionizable fluoride salt is potassium fluoride.

References Cited

UNITED STATES PATENTS 3,234,267   2/1966   Vogh _____ 260—465.7

JOSEPH P. BRUST, Primary Examiner